Jan. 7, 1958  A. D. GUNDERSON  2,818,787
POWERED MASTER UNITS
Original Filed March 18, 1955  3 Sheets-Sheet 1

INVENTOR:
Allen D. Gunderson
BY Peck + Peck
ATTORNEYS

Jan. 7, 1958    A. D. GUNDERSON    2,818,787
POWERED MASTER UNITS
Original Filed March 18, 1955    3 Sheets-Sheet 2

INVENTOR:
Allen D. Gunderson
BY Peck + Peck
ATTORNEYS.

Jan. 7, 1958  A. D. GUNDERSON  2,818,787
POWERED MASTER UNITS
Original Filed March 18, 1955  3 Sheets-Sheet 3

INVENTOR:
Allen D. Gunderson
BY Peck & Peck
ATTORNEYS.

United States Patent Office 2,818,787
Patented Jan. 7, 1958

2,818,787

POWERED MASTER UNITS

Allen D. Gunderson, Racine, Wis., assignor to George Gorton Machine Co., Racine, Wis., a corporation of Wisconsin Original application March 18, 1955, Serial No. 495,245. Divided and this application August 6, 1956, Serial No. 602,377

16 Claims. (Cl. 90—62)

The invention relates to powered master units particularly adapted for powered reproduction by milling, grinding and such like material removing operations on a workpiece of a master or pattern on the unit; and the nature and objects of the invention will be readily apparent to and understood by those skilled in the art to which the invention relates from the following explanation and detailed description of the accompanying drawings illustrating what I at present consider to be a preferred embodiment or mechanical expression of the invention and the several features thereof from among various other embodiments, forms, expressions and combinations of which the invention is capable within the broad spirit and scope thereof as defined in and by the claims hereinafter appearing.

This application is filed as a division of my copending application Serial No. 495,245, filed March 18, 1955, for Profile Milling Machines.

It is a primary object of the invention to provide a powered master unit for increasing the productivity, improving the quality of work and the efficiency generally of profile reproducing machines in which a unit of the invention is incorporated, while reducing the time and attention and the skill required from the operator of the machine.

Another object is to provide a powered master unit which will enable a reproducing machine in which it is incorporated to efficiently automatically form undercut internal or external contours in a workpiece.

A further object is to provide a powered master unit for dictating and controlling the movements of a tool in a workpiece for performing under-cut profile cutting, in which the tracer stylus of the master unit is moved automatically to a position spaced from the master profile of the unit after the tracer stylus has completed a cycle around the master profile and is returned automatically to tracing engagement with the master profile following the start of the tracer stylus on its next tracing cycle.

Another object is to provide a powered master unit with an endless master profile and a tracer stylus movable around the profile by power drive thereof in one direction through a tracing cycle in which the tracer stylus upon reversal of its direction of movement is automatically displaced and guided from the master profile to and held in an inactive position spaced from the master profile and is automatically returned and guided back to tracing engagement by movement of the tracer stylus in the direction of movement of the power driven tracing cycle thereof.

A further object is to provide a powered master unit having the foregoing features which will be mechanically simple yet capable of automatic operations which precision and with a minimum requirement for adjustment and maintenance.

With the foregoing and various other objects, features and results in view which will be recognized from the following detailed description and explanation, my invention consists in certain novel designs, constructions and arrangements of parts and components and in combinations and sub-combinations thereof, all as will be more fully and particularly referred to and specified hereinafter.

Referring to the accompanying drawings in which similar reference characters refer to corresponding parts and elements throughout the several figures thereof:

Fig. 6 is a view, more or less diagrammatic, in vertical transverse section through a work piece showing a milling cutter in position milling an undercut profile surface on the work piece, the milling cutter being shown in elevation.

The powered master unit of the example hereof selected for purposes of describing and explaining the invention, is identified generally by the reference character M, and is shown as incorporated in and operatively combined with a pantographic type of milling machine familiar to the art so that only portions of such milling machine need be shown herein. The milling machine in which the powered master unit M of this example is incorporated may be taken to be of the type and general arrangement and construction which includes a pantograph of the parallelogram type identified generally by the reference character P pivotally mounted and supported in the usual manner from a suitable supporting frame structure (not shown) and including a tracer arm 34 by which the pantograph is actuated under the dictation of the master unit M to move a cutter spindle 21 over a work piece W (see Fig. 6) in precise scaled reproduction of the movements of tracer 75 in following and tracing a master profile surface 64 on the master unit. The cutter spindle 21 is journaled in the usual cutter head (not shown) which is universally laterally moved by the pantograph P from the tracer arm 34 over the work W which is mounted on the usual work table (not shown) of the milling machine. A milling machine of the pantographic type with which the powered master unit M of the invention is incorporated and combined may be taken to be of the type, arrangement and functioning as more fully disclosed and described in my aforesaid pending parent application Serial No. 495,245, of which this present application is a division. It is to be understood as pointed out and explained in my aforesaid parent application that powered master units of my present invention are not limited either to the particular type and construction of pantograph milling machine which have designated for purposes of this example, or to the particular form and expression thereof herein disclosed as adapted to such particular type and arrangement of milling or reproducing machine.

The master unit M of this example of the invention is power driven and connected with the tracer arm 34 of the pantograph linkage which is represented by such tracer arm and identified generally by the reference character P. The master unit M may be considered to be mounted at the rear or outer end portion of a slider head H carried on and provided by the frame of the machine in which the master unit M is incorporated in accordance with the invention. The example master unit M includes a master plate 60 mounted in horizontal position on a slide plate 61 which is mounted and supported on the slider head H of the machine. The master plate 60 is preferably mounted for cross compound movements on the head H of the machine for positional adjustment thereof relative to the pantograph P and the cutter spindle 21 mounted on and universally laterally movable by the pantograph.

The master profile plate 60 is provided with a master profile surface forming recess or pocket 63 therein which provides by the surrounding edge wall thereof formed by the body of the plate 60, the endless master profile surface 64 in planes normal or at angles to the plane of the plate. The master profile surface 64 is formed on the master plate 60 as a precisely scaled enlargement of the contour of the surface which is to be reproduced, as by profile milling in this instance, on a work piece by the cutter spindle 21 which is universally laterally swung over the work piece by the pantograph P. In this example the master profile surface 64 provides a continuous and unbroken surface completely around and surrounding the recess or pocket 63 in the master plate 60.

The tracer stylus assembly S of the master unit M is power driven in tracing engagement with and around the master profile surface 64 and is connected with the tracer arm 34 of the pantograph P in a manner to be hereinafter explained. The tracer stylus assembly S is movably mounted and carried on a holder assembly 65 which is power rotated on and about an axis normal to the plane of the master plate 61, and which is preferably an axis about which the nonsymmetrical endless profile surface 64 may have been generated. In this specific example this holder assembly 65 includes a case or housing 66 fixed to the upper end of a shaft or spindle 67 which extends in vertically disposed position through the base plate 60 within and at a location centrally of the profile recess or pocket 63. The shaft 67 is journaled in the master plate 60 for rotation about an axis normal to the master plate, in this instance a vertical axis, by the vertically spaced annular sets of antifriction bearing assemblies 67a. The case 66 of the tracer stylus holder assembly 65 is thus mounted in horizontally disposed position on and fixed to the upper end of the shaft 67 extending radially in opposite directions thereacross for rotation within the master recess 63 by power applied to the shaft 67. The case 66 has a length less than the minimum width or minimum diameter of the master recess 63 so that it may be freely revolved within the recess around the axis provided by the shaft 67 with its opposite ends spaced from and clear of the master profile surface 64.

A driver rod 68 is mounted in position extending longitudinally through and centrally of the case 66 by a linear or slide bearing assembly 69 mounted within the case 66 intermediate the opposite ends thereof. The driver rod 68 has a length substantially greater than the length of the case 66 and is freely reciprocal through the case in the bearing assembly 69, suitable apertures being provided in the opposite end walls 66a and 66b for freely slidably receiving the driver rod therethrough. A crosshead 70 is attached to and across one end of the driver rod 68. Spaced, parallel guide rods 71 are fixed at their outer ends in the crosshead 70 spaced equal distances from opposite sides, respectively, of the driver rod 68. These actuator rods 71 extend inwardly from and are freely received at their inner end lengths in spring mounting chambers 72, respectively, formed or provided in the case 66. An expansion spring 73 of the coil type is mounted and confined in each chamber 72 over and around the rod 71 in that chamber in engagement at its inner end against the inner end wall formed across the chamber and at its outer end being engaged against the inner side of the crosshead 70. By this arrangement and construction the driver rod 68 is continuously yieldingly biased and projected in a direction outwardly, from the case 66 of the holder assembly 65. The driver rod 68 and its crosshead 70 may be forced inwardly of the case 66 by forces applied thereto to overcome the biasing forces exerted thereon by the springs 73.

The tracer stylus assembly S, in this instance, comprises a tracer pin 75 which is rotatably mounted and journaled in and extending through the crosshead 70 along the axis line of the driver rod 68 and with the axis of the pin 75 intersecting and normal to a projection of the axis of the driver rod. The tracer pin 75 extends a distance below crosshead 70 and mounts rotatably thereon a stylus roller 76 concentric with the axis of the tracer pin and in position spaced a slight distance above the lower end 75a thereof. This lower end 75a of the tracer pin 75 is preferably rounded for a purpose appearing hereinafter. The tracer pin 75 is mounted in the driver arm 68 with the stylus roller 76 opposite or in line with the master profile surface 64 so that the springs 73 in the holder assembly 65 bias the driver rod 68 with the tracer pins 75 outwardly to yieldingly maintain the stylus roller S in rolling and tracing engagement with the master profile surface. Thus rotation of the shaft 67 rotates the holder assembly 65 and the driver rod 68 and tracer pin 75 around the axis of the shaft 67 with the stylus roller 76 moving around and yieldingly maintained in tracing engagement on the master profile surface 64. As the stylus roller 76 moves around the master profile the driver rod 68 and tracer pin 75 moves inwardly and outwardly radially of the axis of rotation of the holder assembly 65 in accordance with the radial distances presented at any point around the master profile surface 64 between the master profile and the axis of rotation of the shaft 67, that is, in accordance with the profile presented by the master profile surface.

The tracer pin 75 extends vertically upwardly a distance above the crosshead 70 and is connected to the outer end of the tracer arm 34 of the pantograph linkage P. The outer end of the tracer arm 34 is provided with a suitable bore transversely therethrough into and through which the upper end length of the tracer pin 75 extends and in which it is fixed to the tracer arm. If desired or found expedient, the outer end of the tracer arm 34 may be provided with the vertically disposed sleeve 34a providing a bore therethrough for receiving and into which the tracer pin 75 extends and is secured. Thus movements of the tracer stylus S around the master profile surface 64 by rotation of the tracer stylus holder assembly 65 while yieldingly maintained in contact with the master profile surface by springs 73 will cause the tracer stylus to move inwardly and outwardly as it traces around the non-symmetrical master profile 64. Such movements of the tracer stylus S as dictated by the master profile surface are transmitted by the tracer pin 75 to the tracer arm 34 and through the pantograph linkage P to the cutter spindle 21 as movements of the cutter spindle in precise and scaled reproductions of the movements of the tracer stylus in following around the master profile surface 64 in engagement therewith.

*Powered drive of the master unit*

The tracer stylus holder assembly 65 is power driven by powered rotation of the driving shaft 67 from the motor MM. The motor MM is mounted and supported in horizontally disposed position by a bracket structure 77 which in this instance is attached to the underside of the master plate 60 to provide the depending vertically disposed mounting plate 77a having the outwardly extending arm 77b to the outer side of which the motor MM is suitably bolted and attached. The motor MM is mounted on the plate 77b in position with the driving shaft 78 of the motor horizontally disposed.

A variable speed transmission unit 80 is suitably mounted and attached on the outer side of the mounting plate 77a of bracket structure 77. The transmission unit 80 is provided with the horizontally disposed power input shaft 81 which is coupled in driven relation with the driving shaft 78 of motor MM by a suitable coupling unit 81a. A bracket 82 is attached to the master plate 60 in position depending therefrom at the inner side of the variable speed transmission unit 80, that is, at the side thereof opposite motor MM. This bracket 82 provides a horizontally disposed casing or housing 83 which journals therein a driven worm shaft 84 in horizontally disposed position in axial alignment with the power output or take-off shaft 85 of the variable speed transmission unit 80. This power take-off shaft 85 is connected in driving relation with the worm shaft 84 by a suitable coupling 86. A worm 87 is mounted on the worm shaft 84 within the housing 83. A shaft 88 is journaled in vertically disposed position in the housing 83 and extends a distance upwardly from that housing as the driving or power input shaft of an electromagnetic clutch unit 90 which is mounted and supported from the master plate 60 in position directly below the driving shaft 67 of the tracer stylus holder assembly 65. The driven shaft of the clutch unit 90 is constituted and provided by the shaft 67 of the tracer stylus holder assembly 65 or as the case may be, is connected with and forms a continuation of shaft 67. The driven component of the clutch unit 90, that is to say, the shaft 67 in this intsance, is in axial alignment with the shaft 88 that is journaled in the housing 83 of the bracket 82. A worm wheel 89 is mounted on the shaft 88 in constant driven mesh with the worm 87 and the worm shaft 84.

The electromagnetic clutch unit 90 may be of any of the types familiar to the art suitable for and adapted to operation in the combination of the powered drive of the transmission of this example machine, for the purpose of clutching or engaging the power driven shaft 88 with the driving shaft 67 of the tracer stylus holder assembly 65 or of declutching and disengaging the power driven shaft 88 from the shaft 67 for free rotation of the latter shaft and the tracer stylus holder assembly 65 and tracer stylus S thereof independently of the powered drive. The clutch unit 90 includes the usual actuating electromagnet or solenoid (not shown). Beyond the general disclosure herein of the clutch unit 90 it is not considered necessary to make a specific structural disclosure in view of the fact that any of the suitable well known electromagnetic clutches may be used as the component in the combination of this example embodiment of the invention. The electromagnet of the clutch unit 90 is connected in a suitable control circuit (not shown) and it will suffice to state that when such circuit is closed the electromagnet actuates the clutch unit to engage shaft 67 in driven connection with the power shaft 88 and when open the clutch unit is actuated to disconnect the shaft 67 and the tracer stylus holder assembly 65 from the powered transmission drive therefor.

*Inactive tracing and cutting positions of the tracer stylus and the cutter spindle*

In accordance with the principles and features of my invention, I have provided a powered master unit by which undercut internal or external profile milling may be performed automatically on a milling or the like reproducing machine of the pantographic type in which a master unit of the invention is incorporated. In carrying out this feature in the instant example the tracer stylus S is movable inwardly from tracing engagement with the master profile surface 64 to an inactive position with simultaneous corresponding movement of the pantograph linkage P and the cutter spindle 21 to position in which an undercut milling cutter on the spindle is spaced from and clear of the undercut profile milled into a work piece for free and unobstructed retraction of the cutter spindle and the milling cutter from the work piece. In carrying out these features of the invention in the instant example I provide in the master profile forming recess or pocket 63 of the master plate a spring biased, pivoted gate or switch member 100 for engagement by the tracer roller 76 of the tracer stylus S for switching or guided displacement of that stylus to an inactive position spaced from and out of tracing engagement with the master profile surface 64 upon the completion of a profile milling cycle. Such movement of the tracer stylus S simultaneously correspondingly moves the cutter spindle 21 through the medium of the pantograph linkage P to a position from which the cutter spindle 21 and an undercut milling cutter thereon may be freely retracted or withdrawn vertically upwardly from the work piece. In order to effect such displacement of the tracer stylus S by the gate member 100 I provide a retractor unit identified generally by the reference character R for engaging the tracer stylus holder assembly 65 following the completion of a tracing cycle of the tracer stylus S around the master profile 64 to reverse the direction of rotation of the tracer stylus holder assembly with the resulting guided displacement of the tracer stylus by the gate or switch 100 to an inactive or "home" position to thereby position the cutter spindle from and feed thereof to the work piece.

Figure 1:
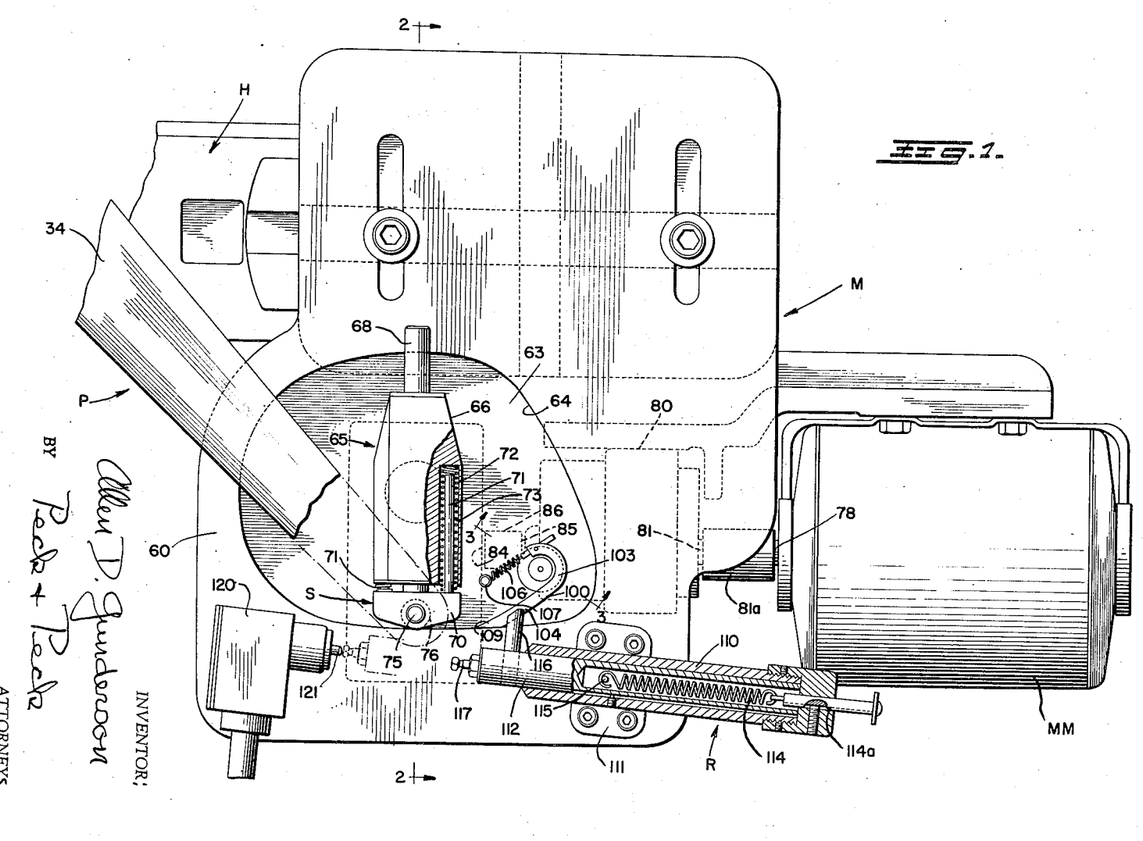
Fig. 1 is a top plan view of the example powered master unit of the invention showing the tracer stylus starting its tracing cycle around the master profile surface, portions of the pantograph milling machine in which the example unit is operatively incorporated being also shown.
Figures 2, 5:
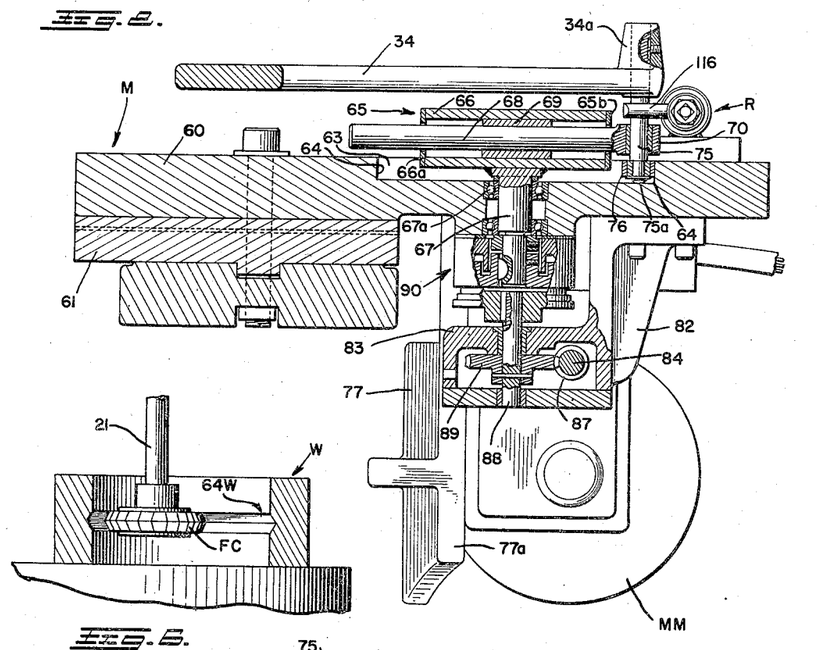
Fig. 2 is a vertical section taken as on the line 2—2 of Fig. 1, and showing particularly the rotatable tracer stylus holder and portions of the powered drive therefor.
Fig. 5 is a fragmentary view in top plan of the master unit showing the tracer stylus moving into engagement at the end of its tracing cycle with the retractor and then showing the tracer stylus engaged by the retractor unit and in position on the gate member being guided thereby to inactive positoin.
Figure 3:
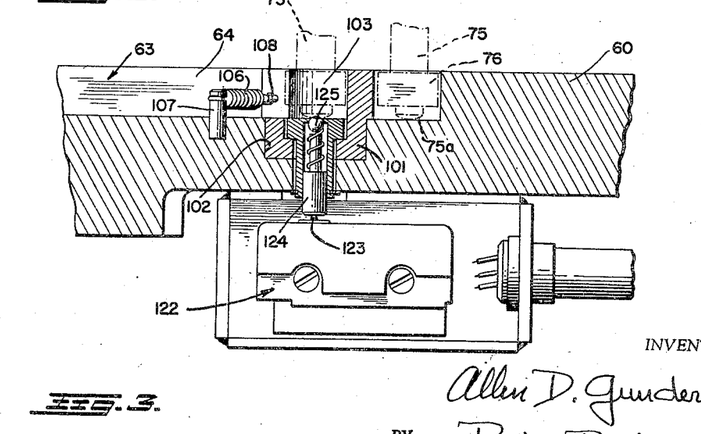
Fig. 3 is a detail view in vertical section taken as on the line 3—3 of Fig. 1, showing the hub of the gate member and its mounting on the master.

In the form of this example, the gate or switch member 100 includes a circular hub or base 101 which is rotatably journaled in a circular mounting recess 102 formed in the master plate 60 at a location in the pocket or recess 63 spaced a distance inwardly from the master profile surface 64 between that surface and the shaft 67. The gate or switch member 100 includes a semi-circular or arcuate inner end portion 103 extending vertically upwardly from and around the exterior surface at one side of the base 101 substantially concentric with the base and the outwardly and forwardly curved gate or switch plate 104 which extends across the master profile recess 63 to and normally at its outer free end 105 engages against the adjacent surface of the maste profile 64. The gate member 100 is mounted and positioned so that the gate or switch plate 104 thereof curves and extends outwardly from the semi-circular inner end 103 thereof on the base 101 in the direction of movement of the tracer stylus S through its power driven tracing cycle around the master profile surface 64, as will be clear by reference to Fig. 1 in particular. This gate member 100 is continuously biased into position with the outer free end 105 thereof engaged against the adjacent portion of the master profile surface 54 by a spring unit 106 comprised of a retractile spring connected at one end to a fixed post 107 in the master profile recess 64 and at its opposite free end coupled to the adjacent end of the semicircular portion 103 of the gate member 100 on the hub 101 by a suitable attaching pin 108. Thus the gate member 100 is yieldingly inwardly displaceable from engagement with the master profile 64 by engagement by the tracer roller 76 of the tracer stylus S as the tracer stylus moves in the clockwise direction through its tracing cycle around the master profile 64. After the tracer roller 76 has moved past and cleared the gate member 100, the biasing spring unit 106 returns the gate member to normal switching position engaging the master profile surface 64. However, reverse movement, that is, movement counterclockwise of the tracer stylus after the tracer roller 76 thereof has passed by and cleared the gate member 100, will cause the tracer roller to ride over the switch point 109 provided by the gate member into engagement with and along the switch plate which then guides the tracer roller and tracer stylus S inwardly to a position received on the hub or base 101 and within the semicircular inner end 103 of the gate member which projects upwardly from such base.

The reverse or counterclockwise movement of the tracer stylus S to its inwardly displaced, inactive position on the base 101 of the gate member 100 is effected automatically in the powered master unit M of the present embodiment, by means of a retractor unit identified generally by the reference character R. This retractor unit R is mounted in position located on the upper side of the master plate 60 along one side of the master profile recess 63 and the tracer stylus holder assembly 65. Retractor unit R includes a tubular casing or barrel 110 mounted in fixed position by the pedestal or mounting base 111 which is suitably fixed to the upper side of the master plate 60. A retractor rod 112 in the form of a tube member is reciprocally mounted in the barrel 110 and projects outwardly or forwardly therefrom. This retractor rod 112 is spring-loaded by a coil type retractile spring 114 connected at its inner end in fixed position in the barrel 110 by an adjustable connector assembly 114a and at its outer end connected into the retractor rod by a suitable pin or connector 115. Thus the spring 114 continuously acts to retract or telescope the retractor rod 112 into the barrel 110. The loading of the spring 114 may be adjusted as required by the adjustable connector assembly 114a. A retractor pin 116 is fixed in and extends radially outwardly from the inner side of the retractor rod 112 adjacent but spaced a slight distance inwardly from the outer end of the rod. This retractor rod has a length relative to the length of the barrel 110 such that in the normal, fully retracted position of the rod the retractor pin 116 projects inwardly across the master profile surface 64 for a distance sufficient to lie in the path of and be engaged by the tracer pin 75 as the tracer stylus S completes its cycle around the master profile. However, the length of the retractor pin 116 is such that in the retracted position thereof its outer end is located clear of the gate member 100 so that the tracer pin 75 may freely move from its inactive or "home" position along the gate member to tracing engagement with the master profile surface 64 as a tracing cycle is started.

A contact button 117 is mounted adjustably in the outer end of the retractor rod 112 in axial alignment with that rod. A microswitch 120 is mounted in fixed position on the upper side of the master plate 60 spaced outwardly thereon from the retractor unit R. The switch 120 includes an operating plunger 121 which normally projects outwardly therefrom on the side thereof facing the retractor unit with the plunger 121 in axial alignment with the retractor rod 112 and the contact button 117 in the outer end thereof. This swich 120 is of the normally closed type with its operating plunger 121 in its normally outwardly projected position and is operated to open position to open an electric circuit into which it is connected by depression of the operating plunger 121. The switch 120 is adapted to be actuated from its normal closed to its circuit opening position when the retractor rod 112 and contact button 117 thereon are projected from normally retracted position of rod 112 to position with the contact button 117 engaged with and depressing the switch actuating plunger 121. This switch 120 is a cycle controlling switch and is connected into a suitable control circuit (not shown) to the solenoid of the clutch unit 90 for controlling the operation of that clutch to connect and disconnect the powered drive from the motor MM to the tracer stylus S.

A microswitch 122 of the multiple type for controlling two (2) circuits is adapted to be actuated to and maintained in position opening one circuit and closing the other circuit when the tracer stylus S is in its inactive or so-called "home" position on the base 101 of the gate member 100. In this specific example the switch 122 includes the operating plunger 123. The switch 122 is mounted in fixed position at the underside of the master plate 60 with the operating plunger 123 thereof extending vertically upwardly from the upper side of the switch in axial alignment with the hub or base 101 of the gate member 100. A spring loaded pin 124 is slidably mounted in an axial bore provided through the hub member 101 and the portion of the master plate 60 therebelow. The pin 124 is in engagement at its lower end with the outer end of the switch operating plunger 123 while a ball 125 is mounted and confined at the upper end of the pin 124 for depression to project the pin 124 downwardly to thereby depress the switch operating plunger 123 to operate the switch from position closing one circuit and opening the other to position opening the first-mentioned and closing the second-mentioned circuit. Upon release of the depressive forces on the ball 125 the spring loading of the pin 124 retracts the pin and releases the switch plunger 123 to permit the switch to restore to its normal condition. The ball 125 projects slightly above the surface at the upper side of the base 101 which provides the seat for the lower end of the tracer pin 75 when that pin and the tracer stylus assembly S are in "home" or inactive position thereon.

Thus, as the tracer stylus S is switched by the gate or switch member 100 from its normal tracing engagement with the master profile 64 to its inactive position on the base 101 of the gate member, the rounded lower end 75a of the tracer pin 75 engages and depresses ball 125 to thereby actuate the switch 122. As long as the tracer stylus S remains in its inactive position at the base 101 the switch 122 is maintained in the position thereof to which actuated by the depression of operating plunger 123. However, when the tracer stylus S is moved from its inactive position as it starts its next tracing cycle around the master profile 64, the end 75a of the tracer pin 75 moves from engagement with the ball 125 so that the switch 122 restores to its normal condition. The switch 122 may be, for example, connected into the control circuit for any suitable indexing mechanism (not shown) for the work table (not shown) of the machine in which the master unit is incorporated so that such table may only be indexed when the tracer stylus S is in its inactive or "home" position withdrawn from the master profile 64 and the cutter spindle 21 is in position removed from the milled profile on the work piece for retraction of the cutter spindle. The switch 122 may, if desired, be also connected into the control circuit of the solenoid of a suitable control valve unit of the operating cylinder of a cutter spindle feed mechanism (not shown) so that the feed mechanism is caused to feed the cutter spindle downwardly when the tracer stylus moves from "home" position and to feed the cutter spindle upwardly when the tracer stylus moves to its "home" position. Such a cutter spindle feed mechanism is not shown herein but is disclosed in my aforesaid parent application Serial No. 495,245.

With the tracer stylus in inactive position on the base 101 of the gate member 100, that is, position withdrawn from tracing engagement with the master profile 64, the retractor rod 112 is in its retracted position with the retractor pin 116 removed from and clear of the path of movement of the tracer pin 75 as that pin, with the tracer stylus S, is moved from inactive position along the gate member 100 and across the switch point 109 into tracing engagement with the master profile surface 64. The tracer stylus holder assembly 65 is power driven from the motor MM through the shaft 67 and moves the tracer stylus S from its inactive or "home" position along the gate member 100 into tracing engagement at the switch point 109 with the master profile surface 64. The tracer stylus S then continues through its tracing cycle in the tracing direction around the master profile surface 64 by the powered rotation of the tracer stylus holder assembly 65. When the tracer pin 75 reaches the retractor pin 116, it engages such pin and thereby picks up the retractor rod 112 and withdraws this rod against the forces of the spring 114 until the contact button 117 is engaged with and operates the switch plunger 121 to open the circuit through switch 120 and thereby disengage the clutch unit 90 to cut off power drive of the tracer stylus holder 65 and tracer stylus S. When the driving shaft 67 for the tracer stylus holder assembly 65 is disengaged from the power drive thereto, the retractor spring 114 instantly takes over and retracts the retractor rod 112 and the pin 116 against which the tracer pin 75 is engaged. Retraction of the pin 116 forces tracer pin 75 in the reverse direction and thus rotates the tracer stylus holder assembly 65 and the tracer stylus S in a counterclockwise direction with the tracer stylus riding onto and along the gate member 104. The tracer stylus S is thus guided and withdrawn radially inwardly from the master profile surface 64 by the gate member 100 against the forces of the springs 73 until seated on the base 101 within the semi-circular portion 103 of the gate member 100, that is, in the inactive or "home" position of the tracer stylus. As the tracer stylus holder assembly 65 with the tracer pin 75 and tracer stylus S are freely rotatable upon disconnection of the powered drive from the shaft 67, the momentum imparted thereto by the spring powered retraction of the retractor rod 112 will be sufficient to coast the assembly to its inactive position following disengagement of the pin 116 from the tracer pin 75. Such momentum imparted to the holder assembly 65 and tracer stylus S is sufficient to overcome the biasing forces exerted by and to compress springs 73 in the holder assembly as the crosshead 70, tracer pin 75 and tracer stylus S are displaced radially inwardly by the inwardly curving track provided by the gate member 100.

As the retractor unit R moves the tracer stylus S and tracer pin 75 over and along the gate member 100, the crosshead 70 with the tracer pin 75 and the tracer stylus S are moved radially inwardly into the master recess 63 with resulting rocking or swinging of the tracer arm 34 which, through the pantograph linkage P, correspondingly swings and moves the cutter spindle 21 and a milling cutter thereon away from the milled profile in a work piece. When the tracer stylus S reaches its inactive or "home" position on the gate member base 101 and comes to rest in that position, the cutter spindle 21 and an undercut milling cutter thereon will have been moved completely clear of the undercut milled surface on the work piece so that the cutter spindle and its milling cutter may then be withdrawn in a straight-line vertically upwardly from the work piece. The tracer stylus S, cutter spindle 21 and a milling cutter thereon remain in such positions for cutter spindle and milling cutter retraction until the start of the next profile milling cycle. At the start of the next milling cycle and while the cutter spindle 21 and a milling cutter thereon are in their retracted position spaced from the surface of the work piece which is to be profile milled, the cutter spindle downfeed mechanism (not shown) may be operated to feed the cutter spindle downwardly to position opposite such surface of the work piece. The power drive of the tracer stylus holder assembly 65 in a clockwise direction is then started and the tracer stylus S is moved outwardly along and is guided by the gate member 100 into tracing engagement with the master profile surface 64. Such movement of the tracer stylus S from inactive position to tracing position actuates the pantograph linkage P which simultaneously correspondingly moves the cutter spindle 21 to position engaging a milling cutter thereon in milling relation with the surface of the work piece which is to be profile milled thereby.

Figure 4:
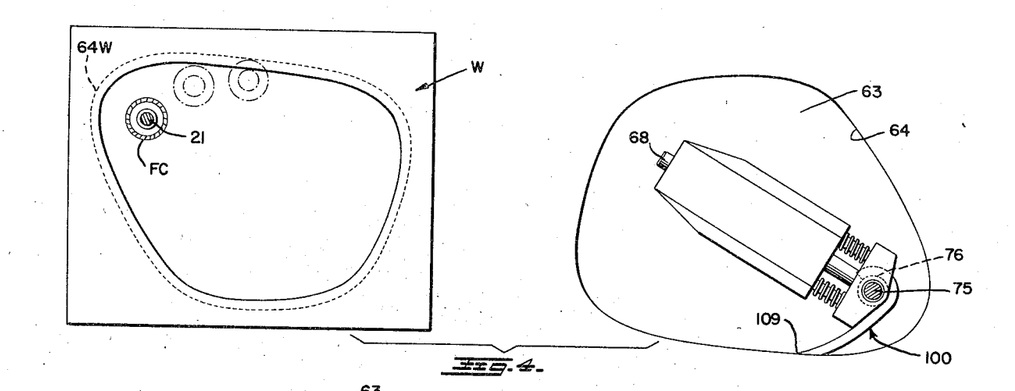
Fig. 4 is a top plan view, more or less diagrammatic, showing the milling cutter in position displaced from the work piece and the tracer stylus moved from the master profile surface to its inactive position.
Figure 5:
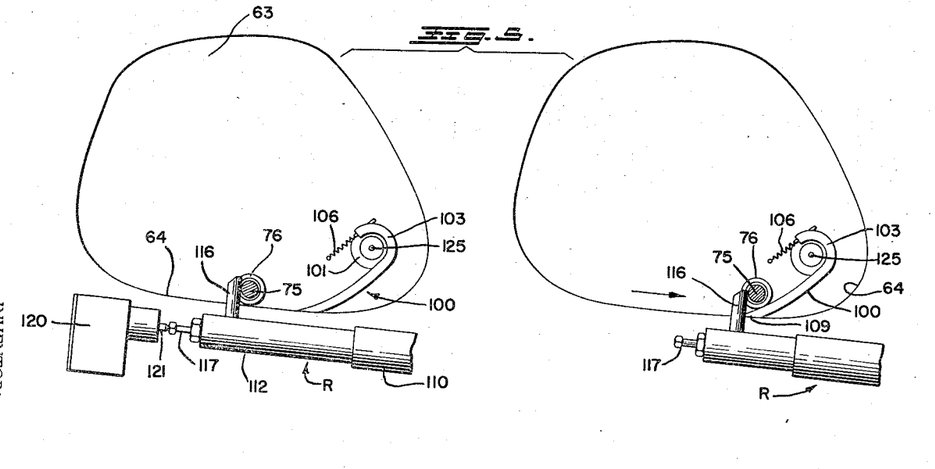

Purely as an example, there is shown in Fig. 6 in vertical transverse section a work piece W having an opening therethrough or a recess opening through one side thereof, around the inner surface of which there is to be profiled milled an undercut profile milled contour 64W which in this instance happens to be a groove or recess of V-shape in cross-section. In order to mill this undercut contour or groove 64W a milling cutter FC of the form milling type is utilized and is mounted in the usual manner on the lower end of the cutter spindle 21 for rotation by and with that spindle. In Fig. 4 the cutter spindle 21 and its milling cutter FC are shown in position withdrawn and displaced from and clear of the undercut groove 64W and the work piece W, that is, these members are then in the positions thereof as dictated and determined by the tracer stylus S when it is in its inactive or "home" position withdrawn from tracing engagement with the master profile surface of the master unit M. Thus, in the foregoing position the cutter spindle 21 and the milling cutter FC may be freely vertically withdrawn and retracted to position clear of the work piece for removal of the work piece from the table T upon the completion of the profile milling cycle. And, in such retracted position the cutter spindle 21 and a milling cutter thereon are also in position to be fed downwardly to the work piece to their down position for displacement from such position radially into milling engagement with the work piece by the movement of the tracer stylus S from its inactive position to tracing engagement with the master profile surface 64.

Obviously, various forms and profile shapes of milling cutters may be utilized for undercut profile milling operations on either the interior or exterior of a work piece. Similarly, the invention may be utilized to perform and carry out non-undercut and straight wall or surface profile milling and there is no intention or desire by the disclosures herein of a set-up for undercut milling to thereby in any sense limit the invention to such types of milling.

Summary of operations

In the automatic operation of the example powered master unit of the invention hereof, profile milling with a machine controlled thereby is started from a position in which the tracer stylus S is in its inactive or "home" position on the base 101 of the gate member 100 spaced from the master profile surface 64. In this inactive position of the tracer stylus S the cutter spindle 21 of a machine is, of course, in retracted position but has also been moved laterally by the pantograph P to a position axially aligned with its inactive position when fed downwardly to a work piece W (see Fig. 4). An under-cutting profile milling cutter FC is mounted in the usual manner on the lower end of the cutter spindle 21. With the tracer stylus S in its inactive position as above defined, the lower end 75a of the tracer pin 75 is engaged with and depresses the operating plunger 123 of the switch 122. Such switch may as referred to hereinbefore, be connected in the control circuits for a suitable feed mechanism (not shown) for the cutter spindle 21. The retractor operated switch 120 is connected into suitable controlling circuits (not shown) for the electro-magnetic clutch unit 90 and with the tracer stylus S in inactive position is closed and the clutch unit is de-energized with the clutch disengaged from driving connection with the driving shaft 67 of the tracer stylus holder assembly 65.

The cycle of the master unit is started by actuating the clutch unit 90 to engage shaft 67 and thus cause rotation of the tracer stylus holder 65 and the tracer stylus S from the motor MM. This rotation in the example hereof is in a clockwise direction. With the engagement of the clutch unit 90 and the rotation clockwise of the shaft 67 through the drive transmission from the master motor MM, when the end 75a of the tracer pin 75 moves from the switch actuating ball 125, the switch 122 is instantly actuated to effect operation of the mechanism controlled thereby which for example may be a downfeed mechanism for the cutter spindle 21. During the carrying out of the operation initiated by the switch 122, the tracer stylus holder assembly 65 is being driven clockwise with the tracer stylus S spring biased yieldingly into engagement against the gate member 100. As the tracer stylus S is moved outwardly along the gate member 100, the tracer stylus is guided thereby into position with the tracer roller 76 in rolling, minimum friction engagement with the master profile surface 64. The movement radially or laterally outwardly of the tracer stylus S correspondingly moves the cutter spindle 21 and its milling cutter FC into position with the milling cutter in milling engagement with a work piece W. The tracer stylus is then power driven by the motor MM around and in tracing engagement with the master profile surface 64 through the tracing cycle.

When the tracer stylus S has moved around and through its tracing cycle to the gate member 100, the tracer roller 76 engages against and forces itself past the gate member with the latter member yielding radially inwardly against the forces of its biasing spring 106. The tracer stylus S thus uninterruptedly continues through its tracing cycle for a distance past the gate member 100 with the gate member restoring to its normal position under the action of spring 106 as soon as the tracer stylus has cleared. However, when the tracer stylus S reaches the gate member 100, the tracer pin 75 engages against the retractor pin 116 on the retractor rod 112. After picking up the tracer pin 116 the tracer stylus S continues its tracing movements in the clockwise direction without interruption under the power drive from the motor MM. The continued power driven movement of the tracer stylus S past the gate member 100 withdraws and extends the retractor rod 112 from its retracted position within barrel R against the forces of the spring 114 until the contact button 117 at the outer end of the retractor rod engages the switch operating plunger 123 of the microswitch 120.

When the tracer stylus S has moved around the master profile surface 64 to a point where the contact button 117 of the retractor rod 112 engages the switch actuating plunger 123, the depression of the latter plunger opens the switch 120 and opens the circuit through the clutch solenoid (not shown) of the clutch unit 90 and thus effects operation of the clutch unit to declutch and disconnect the driving shaft 67 from the powered drive transmission from the motor MM. Instantly upon the disconnection of shaft 67 from its powered drive, this shaft with the tracer stylus holder assembly 65 and the tracer stylus S are released for free rotation thereof in either direction and the retractor unit R then takes over and under the action of the spring 114 moves the tracer stylus S in the reverse or counter-clockwise direction onto and along the gate member 100 with the gate member guiding and forcing the tracer stylus radially inwardly to the base 101. In this particular example the retractor pin 116 of the retractor unit R disengages from and releases the tracer pin 75 of the tracer stylus S at an intermediate point along the gate member 100 before the tracer stylus S reaches its inactive or "home" position on the gate member base 101. The tracer stylus S, rotating with it the holder assembly 65 and the shaft 67, moves to inactive position on the base 101 under the impetus imparted thereto by the retraction of the spring loaded rod 112 of the retractor unit R. The tracer stylus S is stopped and brought to rest when it reaches inactive position on the base 101 by the curved base portion 103 of the gate member which forms a stop barrier in the path of the tracer stylus.

During the tracing cycle the milling cutter FC is in undercut profile milling engagement with and around the work piece W to mill therein the undercut groove or recess 64W (see Fig. 6). The profile of the groove 64W is accurately and precisely determined by and is a reproduction of the master profile surface 64 through the operation of the pantograph linkage P which couples the cutter spindle 21 and the milling cutter FC mounted thereon with the tracer stylus S. Following the completion of the milling cycle the movements of the tracer stylus S in the reverse direction and radially inwardly from the master profile surface 64 under the guidance of the gate member 100 to position on the gate member base 101, are transmitted by the pantograph linkage P as precisely corresponding movements of the cutter spindle 21 and a milling cutter thereon. Hence, when the tracer stylus S reaches and comes to rest at its inactive position, the cutter spindle 21 and milling cutter FC thereon will be displaced radially inwardly to a corresponding inactive position clear of and spaced from the undercut profile milled surface of a work piece, say, for example, the milled groove 64W of work piece W. With the cutter spindle and milling cutter in such inactive position completely clear of the undercut profile mill in and unobstructed by the work piece, the cutter spindle and milling cutter may be freely withdrawn to retracted position and may be as freely fed downwardly from retracted position to such inactive or down position at the work piece.

It will also be evident that various other changes, modifications, designs, constructions, additions, substitutions, eliminations and combinations and subcombinations may be resorted to without departing from the broad spirit and scope of my invention, and hence I do not desire or intend to limit or restrict my invention to the exact and specific forms and embodiments of the example hereof, except as may be required by any specific and intended limitation thereto appearing in any of the claims hereto appended.

What I claim is:

1. A powered master unit including, in combination, a master plate structure; a driving shaft journaled in said master plate structure normal to the general plane thereof; a tracer stylus holder mounted on said driving shaft at one side of said master plate structure in position disposed radially of said shaft; powered drive means for rotating said driving shaft to revolve said tracer stylus holder; an endless master profile surface on said master plate structure surrounding and of a diameter greater than the maximum length of said tracer stylus holder, a tracer stylus mounted on said tracer stylus holder for movements radially toward and from said surrounding master profile surface; and biasing means on said tracer stylus holder acting to continuously bias said tracer stylus radially outwardly into tracing engagement with and around said master profile surface as said tracer stylus holder is rotated by said power driven shaft.

2. A powered master unit including, in combination, a master plate structure; a driving shaft journaled in said master plate structure for rotation about an axis normal to the general plane thereof; a tracer stylus holder mounted on said driving shaft at one side of said master plate structure in position disposed radially of said shaft; powered drive mechanism for rotating said driving shaft to revolve said tracer stylus holder about the axis of said shaft; an endless master profile surface on said master plate structure surrounding and opposite said tracer stylus holder; a tracer stylus assembly mounted on and carried by said tracer stylus holder for movements independently thereof radially toward and from and for movements by said holder around and in tracing engagement with said surrounding master profile surface; said tracer stylus assembly including a tracer pin having rotatably mounted thereon a tracer roller for tracing engagement with and around said endless master profile surface; and biasing means on said tracer stylus acting to continuously yieldingly bias said tracer stylus assembly radially outwardly to yieldingly engage said tracer roller in tracing engagement with said master profile surface as said tracer stylus holder is revolved by said power driven rotary shaft.

3. A powered master unit including, in combination, a master plate structure mounted in normally fixed position; a master profile surface on said master plate structure; a tracer stylus movably mounted on said master plate structure for movement in tracing engagement with and along and for movements radially toward and from said master profile surface; biasing means acting to continuously yieldingly bias said tracer stylus into tracing engagement with said master profile surface; and powered means for moving said tracer stylus in tracing engagement with and along said master profile surface through a tracing cycle.

4. A powered master unit including, in combination, a master plate structure mounted in normally fixed position; an endless master profile surface on said master plate structure; a tracing stylus mounted for movements in either direction on and around said master profile surface and for movements radially toward and from said master profile surface; biasing means continuously acting to yieldingly bias said tracer stylus into tracing engagement with said master profile surface; a powered drive means for moving said tracer stylus in one direction around said master profile surface through a tracing cycle; and means for engagement by said tracer stylus when moved in the direction reverse to the direction of movement thereof through the tracing cycle for guiding and radially displacing said tracer stylus to an inactive position out of engagement with said master profile surface.

5. A powered master unit including, in combination, an endless master profile surface; a tracer stylus mounted for movements in either direction around and for movements radially toward and from said master profile surface; a powered drive mechanism for moving said tracer stylus in one direction around said master profile surface in tracing engagement therewith through a tracing cycle; and means for moving said tracer stylus in the direction reverse to the direction of movement through the tracing cycle to an inactive position spaced radially from and out of engagement with said master profile surface.

6. A powered master unit, including, in combination, a master plate structure; an endless master profile surface on said plate structure; a tracer stylus mounted for movements around said master profile surface in tracing engagement therewith; said tracer stylus being also mounted for movements radially toward and from said master profile surface; biasing means acting to continuously yieldingly bias said tracer stylus into tracing engagement with said master profile surface; a powered drive mechanism connected with said tracer stylus for moving said tracer stylus in one direction around said master profile surface in tracing engagement therewith through a tracing cycle; clutch means for connecting and disconnecting said powered drive mechanism to and from said tracer stylus; retractor mechanism for moving said tracer stylus in the direction reverse to the direction of movement of said tracer stylus through the tracing cycle when said powered drive mechanism is disconnected from said tracer stylus by said clutch means; and means for guiding said tracer stylus to an inactive position spaced from and out of engagement with said master profile surface when said tracer stylus is moved in said reverse direction by said retractor mechanism.

7. A powered master unit including, in combination, an endless master profile surface; a tracer stylus mounted for movements in one direction through a tracing cycle around and in tracing engagement with said endless master profile surface; a powered drive mechanism for moving said tracer stylus through said tracing cycle; said tracer stylus being also mounted for movements radially to and from tracing engagement with said master profile surface; biasing means continuously acting to yieldingly bias said tracer stylus into tracing engagement with said master profile surface; means for guiding said tracer stylus to an inactive position spaced from and out of tracing engagement with said master profile surface when said tracer stylus is moved in the reverse direction to the direction of movement thereof through the tracing cycle; and means for moving said tracer stylus in the said reverse direction.

8. A powered master unit including, in combination, an endless master profile surface; a tracer stylus mounted for movements in one direction around and in tracing engagement with said endless master profile surface through a tracing cycle; said tracer stylus being also mounted for movements radially to and from said master profile surface; biasing means acting to continuously yieldingly bias said tracer stylus into tracing engagement with said master profile surface as said tracer stylus is moved through said tracing cycle; a powered drive mechanism for moving said tracer stylus through the tracing cycle; a gate member pivotally mounted at a location spaced radially inwardly from said master profile surface and being curved radially outwardly from said location in the direction of rotation through the tracing cycle to and engaged at its outer free end with said master profile surface; biasing means continuously acting to bias and maintain said gate member in position with the outer end thereof engaged against said master profile surface; said gate member being yieldably displaceable by said tracer stylus when said tracer stylus is being moved therepast in the direction of movement through said tracing cycle; and said gate member being engageable by said tracer stylus when the latter is moved in said reverse direction for guiding said tracer stylus to an inactive position spaced radially inwardly from said master profile surface.

9. A powered master unit including, in combination, a master plate structure; an endless master profile surface on said master plate structure; a tracer stylus mounted for movements around and in tracing engagement with said endless master profile surface; said tracer stylus being also mounted for movement radially to and from tracing engagement with said master profile surface; biasing means continuously acting to yieldingly bias said tracer stylus into tracing engagement with said master profile surface; a powered drive mechanism for moving said tracer stylus in one direction through a tracing cycle; said powered drive mechanism including clutch means for connecting said tracer stylus for driven connection therewith and for disconnecting said tracer stylus therefrom; a retractor mechanism for engaging said tracer stylus when said powered drive mechanism is disconnected therefrom for moving said tracer stylus in the reverse direction to the direction of movement thereof through said tracing cycle; and a gate member pivotally mounted on said master plate structure extending outwardly and forwardly in the direction of movement of said tracer stylus through its tracing cycle for engaging and guiding said tracer stylus when moved by said retractor mechanism to an inactive position spaced radially inwardly from said master profile surface.

10. In combination, a structure provided with an endless master profile surface thereon; a tracer stylus mounted for movements in either direction around said master profile surface; said tracer stylus being moved in tracing engagement with said master profile surface through a tracing cycle in one direction; and means operative to engage and displace said tracer stylus radially inwardly from said master profile surface to an inactive position spaced therefrom when said tracer stylus is moved in the direction reverse of the direction of movement thereof through the tracing cycle.

11. In combination, a structure provided with a master profile surface thereon; a tracer stylus mounted for movements in either direction along said master profile surface; means for moving said tracer stylus in one direction through a tracing cycle in tracing engagement with said master profile surface; said tracer stylus being also mounted for movements radially toward and from said master profile surface; means for moving said tracer stylus in the reverse direction to the direction of movement thereof through said tracing cycle; and means operative to displace said tracer stylus radially to an inactive position spaced from engagement with said master profile surface when said tracer stylus is moved in said reverse direction.

12. In combination, a supporting structure; a master profile surface on said supporting structure; a tracer stylus mounted for movements around said master profile surface in tracing engagement therewith through a tracing cycle; means for moving said tracer stylus through a tracing cycle; said tracer stylus being also mounted for movements between a position in tracing engagement with said master profile surface and an inactive position spaced therefrom; and means operative upon the completion of a tracing cycle for moving said tracer stylus from tracing engagement with said master profile surface to said inactive position.

13. A master unit including, in combination, a profile surface; a tracer stylus mounted for movements in one direction through a tracing cycle along said profile surface in tracing engagement therewith; said tracer stylus being also mounted for movements along said profile surface in the direction opposite the direction of movements thereof through the tracing cycle and for movements radially toward and from said profile surface; means for guiding said tracer stylus when moved in the direction reverse of the direction of movement through the tracing cycle to an inactive position spaced radially from and out of engagement with said master profile surface; and means for moving said tracer stylus in said reverse direction to said inactive position.

14. A master unit, including, in combination, a master profile surface; a tracer stylus mounted for movements in one direction along said master profile surface in tracing engagement therewith through a tracing cycle; said tracer stylus being also mounted for movements along said profile surface in the direction reverse to the direction of movement thereof through a tracing cycle and for movements radially toward and from said master profile surface; biasing means acting to continuously yieldingly bias said tracer stylus into tracing engagement with said master profile surface; and means for guiding said tracer stylus radially to an inactive position spaced from and out of engagement with said master profile surface when said tracer stylus is moved in the direction reverse to the direction of movement thereof through a tracing cycle.

15. In combination, a supporting structure; a master profile surface on said supporting structure; a tracer stylus mounted for movements in tracing engagement with said master profile surface in one direction therealong through a tracing cycle; said tracing stylus being also mounted for movements along said profile surface in the reverse direction to the direction of movement thereof through a tracing cycle and for movements radially toward and from said profile surface; and means operative to displace said tracer stylus radially from tracing engagement with said profile surface to an inactive position spaced therefrom when said tracer stylus is moved in the reverse direction to the direction of movement thereof through a tracing cycle.

16. A powered master unit including, in combination, a master plate structure; a driving shaft rotatably mounted for rotation about an axis generally normal to the plane of said master plate structure; a tracer stylus holder mounted on said driving shaft at one side of said master plate structure in position on said driving shaft disposed radially thereof; power drive mechanism connected with said driving shaft for rotating said driving shaft to revolve said tracer stylus holder about the axis of said driving shaft; a master profile surface on said master plate structure opposite said tracer stylus holder; a tracer stylus assembly mounted on and carried by said tracer stylus holder for movements thereon independently thereof radially toward and from and for movements by said tracer stylus holder along said master profile surface; said tracer stylus assembly including a tracer stylus thereon for tracing engagement with and along said master profile surface; and biasing means on said tracer stylus holder acting to continuously yieldingly bias said tracer stylus assembly radially outwardly to engage said tracer stylus in tracing engagement with said master profile surface as said tracer stylus holder is revolved.

References Cited in the file of this patent

UNITED STATES PATENTS

| | | |
|---|---|---|
| 2,345,218 | Rosen | Mar. 28, 1944 |
| 2,375,378 | Morris | May 8, 1945 |
| 2,699,606 | Breau | Jan. 18, 1955 |
| 2,733,642 | Beatty et al. | Feb. 7, 1956 |